US00RE37673E

(19) United States
(12) Reissued Patent
Leahy et al.

(10) Patent Number: US RE37,673 E
(45) Date of Reissued Patent: Apr. 30, 2002

(54) METHODS FOR FABRICATING A HELICOPTER MAIN ROTOR BLADE

(75) Inventors: Kevin P. Leahy, Naugatuck; Corey D. Jones, Prospect, both of CT (US)

(73) Assignee: Sikorsky Aircraft Corporation, Stratford, CT (US)

(21) Appl. No.: 08/890,263

(22) Filed: Jul. 9, 1997

Related U.S. Patent Documents

Reissue of:
(64) Patent No.: 5,528,828
Issued: Jun. 25, 1996
Appl. No.: 08/445,627
Filed: May 22, 1995

U.S. Applications:
(62) Division of application No. 08/275,556, filed on Jul. 15, 1994, now Pat. No. 5,430,937.

(51) Int. Cl.[7] ..... B23P 15/00
(52) U.S. Cl. ..... 29/889.6; 29/706; 29/822
(58) Field of Search ..... 29/881.6, 706, 29/822, 889.61, 824, 707, 700

(56) References Cited

U.S. PATENT DOCUMENTS 1,967,487 A * 7/1934 Wainus ..... 29/889.6
2,421,956 A * 6/1947 McComb ..... 29/889.6
2,742,947 A * 4/1956 Dobbs ..... 29/889.6
4,407,688 A * 10/1983 Mussi et al. ..... 29/889.6
4,776,076 A * 10/1988 Frank et al. ..... 29/889.6
4,868,962 A * 9/1989 McArdle et al. ..... 29/889.6

* cited by examiner

*Primary Examiner*—I Cuda Rosenbaum

(57) ABSTRACT

A method for fabricating a helicopter main rotor blade includes a compaction fixture for assembling and compacting blade subassembly components and a sheath spreading/insertion apparatus for spreading and inserting a leading-edge sheath [onto] *in combination with* the blade subassembly during the compaction process. The compaction fixture includes a lower assembly having a contoured upper airfoil nest mounted in combination with a support structure and an upper assembly having a pressure bag affixed in sealed combination to a contoured backplate affixed in combination to a structural support truss. The contoured upper airfoil nest includes a plurality of tooling pins for locating an upper composite skin in aligned combination on the contoured upper airfoil nest and a plurality of pusher pins for chordwise alignment of a spar assembly in the contoured upper airfoil nest. Spar stanchions affixed to the support structure provide spanwise alignment of the spar assembly in the contoured upper airfoil nest. With the upper and lower assemblies in locked combination, the pressure bag is pressurized to compact the assembled blade subassembly components.

3 Claims, 5 Drawing Sheets

FIG. 1A
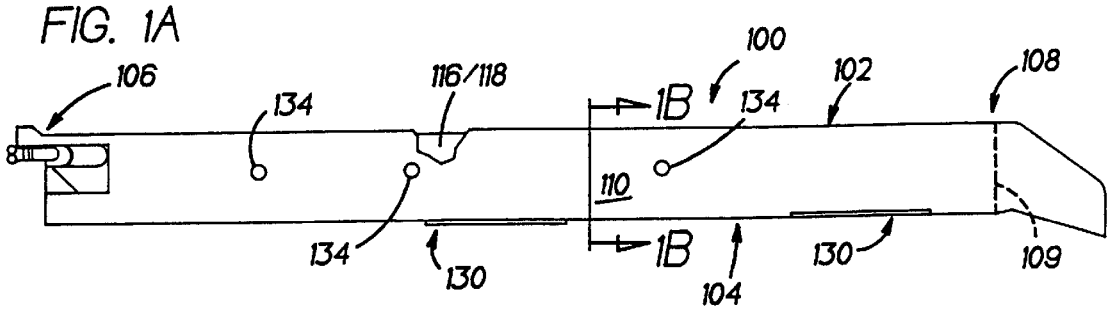
FIG. 1B
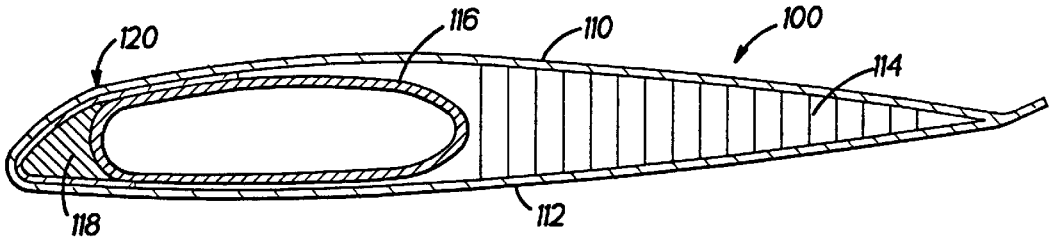
FIG. 1C
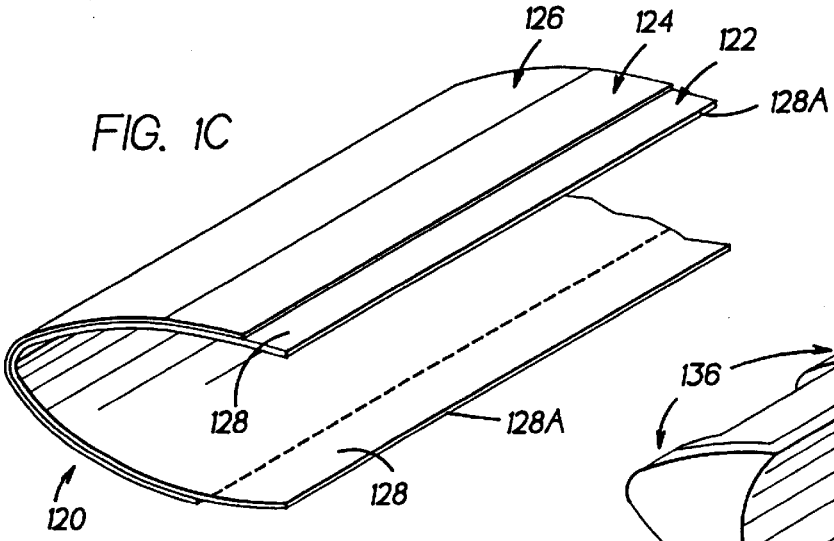
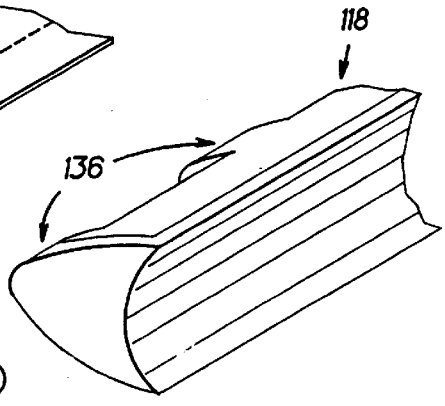
FIG. 1D

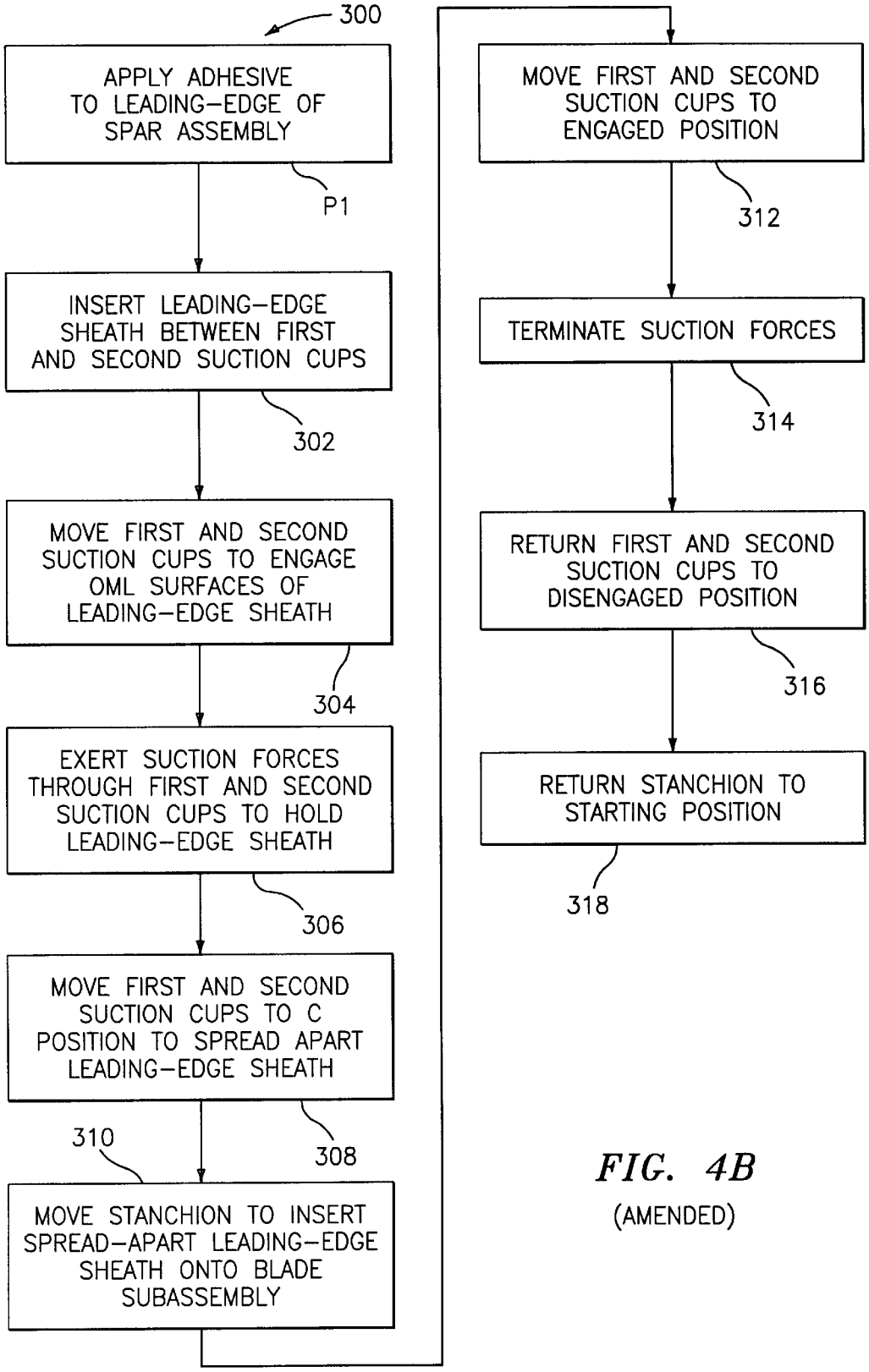
*FIG. 4B*
(AMENDED)

METHODS FOR FABRICATING A HELICOPTER MAIN ROTOR BLADE

Matter enclosed in heavy brackets [ ] appears in the original patent but forms no part of this reissue specification; matter printed in italics indicates the additions made by reissue.

RELATED APPLICATION

The instant application is related to commonly-owned, U.S. patent application is a divisional application U.S. patent application Ser. No. 08/275,556, filed 15 Jul. 1994, now U.S. Pat. No. 5,430,937 and entitled AN EOP SCRIBE DEVICE (S-4887).

TECHNICAL FIELD

The present invention is directed to manufacturing apparatus and methods, and more specifically, to apparatus and methods for fabricating a helicopter main rotor blade.

BACKGROUND OF THE INVENTION

There is a growing trend in the aerospace industry to expand the use of composite materials for a diverse array of structural and dynamic applications. One particular application for the use of composite materials lies in the fabrication of main rotor blades for helicopters.

With increased usage of composite materials to fabricate main rotor blades, the helicopter industry is continually seeking to improve the tooling and/or methods used to fabricate main rotor blades so as to reduce the per unit fabrication costs associated with the main rotor blades. Typically, the per blade fabrication costs are higher than need be due to part rejections or rework that occurs during the main rotor blade fabrication process. Part rejections typically occur where the composite material has been so substantially damaged during the fabrication process that rework is not cost effective or where a finished fabricated part exceeds the tolerance limits established for the part. Rework occurs where the composite material has been damaged during the fabrication process, and the damage may be repaired in a relatively cost effective manner.

Sikorsky Aircraft has developed a parallel manufacturing protocol for fabricating helicopter main rotor blades wherein a blade subassembly and a leading-edge sheath are concurrently fabricated as individual components, and then the prefabricated blade subassembly and the prefabricated leading-edge sheath are integrated in combination to form an assembled main rotor blade. The assembled main rotor blade is subsequently cured to form a finished main rotor blade. This protocol was adopted in large measure because experience has shown that the leading edges of main rotor blades are subjected to varying degrees of abrasion during helicopter operations. As a result of such abrasion effects, the leading edge of a helicopter main rotor blade at some point becomes aerodynamically unsuitable for further use. Rather than replacing the entire main rotor blade, it was determined that a replaceable leading-edge sheath would allow abrasion-degraded main rotor blades to be efficaciously and economically repaired.

The prior art process for fabricating blade subassemblies involved the use of a "clamshell" tooling fixture and a "wet" lay-up process for the composite materials. It was determined that the rejection rate for blade subassemblies fabricated using the clamshell tooling fixture and the wet lay-up process was unacceptable in light of the today's competitive market. The dependability and accuracy of the clamshell tooling fixture depended upon the stability of the laid up tooling contours, the proper securing and pinning of all fasteners and locators, and the variability in applying blade outer mold line pressures. The clamshell tooling fixture and the wet lay-up process were subjected to shrinkage and lose of tolerances, which led to component rejection. The clamshell configuration result in asymmetrical pressure distributions across the layed-up blade subassembly.

Another area of concern in the parallel manufacturing protocol was the sheath spreader tool used to integrate the leading-edge sheath in combination with the blade subassembly. The leading-edge sheath has a prefabricated configuration that does not allow the sheath to be inserted directly onto the blade subassembly. Rather, the aft edges of the leading-edge sheath must be spread apart to allow the leading-edge sheath to be inserted onto the blade subassembly. The prior art sheath spreader tool comprises segmented angular stainless steel sheet metal grabbers that are mounted spanwise on the aft edges of the leading-edge sheath in contact with the inner mold line (IML) surfaces (which are formed of composite material) of the leading-edge sheath. Each segment of the prior art grabber is individually actuated by means of a side cam lever. The prior grabbers exert a shearing action against the IML surfaces of the leading-edge sheath in spreading the aft edges of the sheath apart. The shearing action caused by the prior art grabbers caused cracks and delaminations in the composite material subjected to the shearing action thereof, resulting in component rejections or rework. In addition to the foregoing deficiency of the prior art leading-edge sheath spreader tool, the segments of the grabber are individually actuated in a sequential manner such that to spread apart the entire leading-edge sheath involves multiple, repetitive operations. Not only is such a procedure labor intensive and time consuming, and hence costly, such a procedure may induce unwanted stresses into the aft edges of the leading-edge sheath.

A need exists to provide an apparatus for spreading a leading-edge sheath for insertion onto a blade subassembly without inducing cracks and/or delaminations in the composite material of the leading-edge sheath. Preferably, the apparatus should spread the leading-edge sheath apart in a single operation to reduce the time required to spread the leading-edge sheath apart. A need also exists to provide a fixture for assemblage and compacting of a blade subassembly that provides a uniform pressure distribution during the compaction of the blade subassembly, that facilitates the use of prepreg composite materials, and that ensures proper chordwise and spanwise alignment of the components of the blade subassembly layed-up in the fixture. A need also exists to provide a sheath spreading apparatus and compaction fixture which in combination simplify the insertion of a spread-apart leading-edge sheath onto the blade subassembly.

SUMMARY OF THE INVENTION

One object of the present invention is to provide a sheath spreading/insertion apparatus that spreads apart a leading-edge sheath without inducing cracks and/or delaminations in the composite material thereof.

Another object of the present invention is to provide a sheath spreading/insertion apparatus that spreads apart a leading-edge sheath in a single operation.

A further object of the present invention is to provide a compaction fixture for assemblage and compaction of blade subassembly components that provides a uniform pressure distribution during compaction of the blade subassembly.

Still another object of the present invention is to provide a compaction fixture that ensures proper chordwise and spanwise alignment of the components comprising the blade subassembly as assembled in the compaction fixture.

One more object of the present invention is to provide a sheath spreading/[insertion] *positioning* apparatus and a compaction fixture which, in combination, greatly simplify the [insertion] of a spread-apart leading-edge sheath assembly [onto] *in relation to* the blade subassembly.

These and other objects of the present invention are achieved by a sheath spreading/[insertion] *positioning* apparatus according to present invention for spreading a leading-edge sheath and [inserting] *positioning* the spread-apart leading-edge sheath in [combination with] *relation to* a blade subassembly. The sheath spreading/[insertion] *positioning* apparatus comprises a [movable] stanchion, [an upper] *a first* elongate carriage member mounted in movable combination with the [movable] stanchion and a [lower] *second* elongate carriage member mounted in movable combination with the [movable] stanchion. A plurality of suction cups are mounted in combination with each of the [upper] *first* and [lower] *second* elongate carriage members. A means is provided by imparting synchronized movement to the [upper] *first* and [lower] *second* carriage members between a disengaged position wherein the leading-edge sheath may be inserted between the pluralities of suction cups mounted in combination with the [upper] *first* and [lower] *second* carriages without contact therewith, an engaged position wherein the pluralities of suction cups abuttingly engage respective outer mold line (OML) surfaces of the leading-edge sheath, and an operating position wherein the leading-edge sheath is spread apart for [insertion onto] *positioning in relation to* the blade subassembly. A means is provided for generating suction forces in the pluralities of suction cups in the engaged position to cause the suction cups to hold the respective OML surfaces of the leading-edge sheath such that subsequent synchronized movement of the [upper] *first* and [lower] *second* carriage members to the operating position causes the leading-edge sheath to be spread apart. A means is provided for [moving the movable stanchion] *imparting relative movement between the spread-apart leading-edge sheath and the blade subassembly* to [insert] *position* the spread-apart leading-edge sheath [onto] *in relation to* the blade subassembly.

The sheath spreading/[insertion] *positioning* apparatus further includes a means for indicating that the spread-apart leading-edge sheath has been fully [inserted onto] *positioned in relation to* the blade subassembly. The synchronized movement imparting means comprises a plurality of pneumatic cylinders mounted in combination with the [upper] *first* elongate carriage member and the [movable] stanchion, a plurality of pneumatic cylinders mounted in combination with the [lower] *second* elongate carriage members and the [movable] stanchion, and a pressure source pneumatically interconnected to the pluralities of pneumatic cylinders. Actuation of the pressure source provides pressurized air to the pluralities of pneumatic cylinders to cause synchronized movement of the [upper] *first* and [lower] *second* elongate carriage members between the disengaged position wherein the leading-edge sheath may be inserted between the pluralities of suction cups mounted in combination with the [upper] *first* and [lower] *second* elongate carriage members without contact therewith, the engaged position wherein the pluralities of suction cups abuttingly engage respective OML surfaces of the leading-edge sheath, and the operating position wherein the leading-edge sheath is spread apart for [insertion onto] *positioning in relation to* the blade subassembly. For the described embodiment, ninety suction cups are mounted in combination with the [upper] *first* elongate carrier member and ninety suction cups are mounted in combination with the [lower] *second* elongate carrier member.

To spread and [insert] *position* the leading-edge sheath in [combination with] *relation to* a blade subassembly, the leading-edge sheath is mounted between [upper] *first* and [lower] *second* rows of suction cups, the [upper] *first* and [lower] *second* rows of suction cups are displaced in synchronized movement to an engaged position wherein the suction cups abuttingly engage respective OML surfaces of the leading-edge sheath, suction forces are generated in the [upper] *first* and [lower] *second rows of* suction cups to cause the suction cups to hold the respective OML surfaces of the leading-edge sheath, the [upper] *first* and [lower] *second* rows of suction cups are displaced in synchronized movement to an operating position to cause the leading-edge sheath to be spread apart, and the spread-apart leading-edge sheath is [inserted onto] *positioned in relation to* the blade subassembly.

A compaction fixture according to the present invention is provided for assembling and compacting a blade subassembly that includes upper and lower composite skins, a honeycomb core, and a spar assembly (a spar with at least one counterweight bonded thereto). The compaction fixture comprises a lower assembly that includes a support structure and a contoured upper airfoil nest mounted in combination with the support structure. The contoured upper airfoil nest has an OML surface that defines the airfoil surface of the upper composite skin, a plurality of tooling pins for locating the upper composite skin, honeycomb core combination in the contoured upper airfoil nest, and a plurality of pusher pins for locating the spar assembly in chordwise alignment in the contoured upper airfoil nest. A spar stanchion is mounted in combination with the inboard and outboard ends of the contoured upper airfoil nest, respectively, for locating the spar assembly in spanwise alignment in the contoured upper airfoil nest. The compaction fixture further comprises an upper assembly that includes a structural support truss, a contoured backplate affixed to the structural support truss, and a pressure bag having chordwise and spanwise dimensions corresponding to the blade subassembly fastened in sealed combination with the contoured backplate. A means is provided for locking the upper and lower assemblies in combination so that compaction of the blade subassembly assembled in the lower assembly may be effectuated. A means is provided for pressurizing the pressure bag to compact the blade subassembly disposed in the locked upper and lower assemblies. The compaction fixture may further include a caul plate interposed between the upper and lower assemblies to provide uniform pressure distribution over the layed-up blade subassembly during compaction thereof.

To assemble and compact the blade subassembly, a composite fixture as described in the preceding paragraph is provided. The upper composite skin and the honeycomb core are layed-up in combination in the contoured upper airfoil nest. The spar assembly is located in chordwise and spanwise alignment in the contoured upper airfoil nest, and the lower composite skill is layed-up in combination with the spar assembly and the honeycomb core. The upper and lower assemblies are locked in combination and the pressure bag is pressurized to compact the assembled blade subassembly.

BRIEF DESCRIPTION OF THE DRAWINGS

A more complete understanding of the present invention and the attendant features and advantages thereof may be had by reference to the following detailed description when considered in conjunction with the following drawings wherein:

FIG. 1A is a top plan view of an exemplary main rotor blade for an H-60 helicopter.

FIG. 1B is a cross-sectional view of the main rotor blade of FIG. 1A taken along line 1B—1B thereof.

FIG. 1C is an enlarged partial perspective view of the leading edge sheath illustrated in FIG. 1B.

FIG. 1D is an enlarged partial perspective view of a counterweight for the exemplary main rotor blade of FIG. 1A.

FIG. 4B is a flow chart illustrating the sheath spreading and sheath insertion process according to the present invention.

BEST MODE FOR CARRYING OUT THE INVENTION

Figure 2:
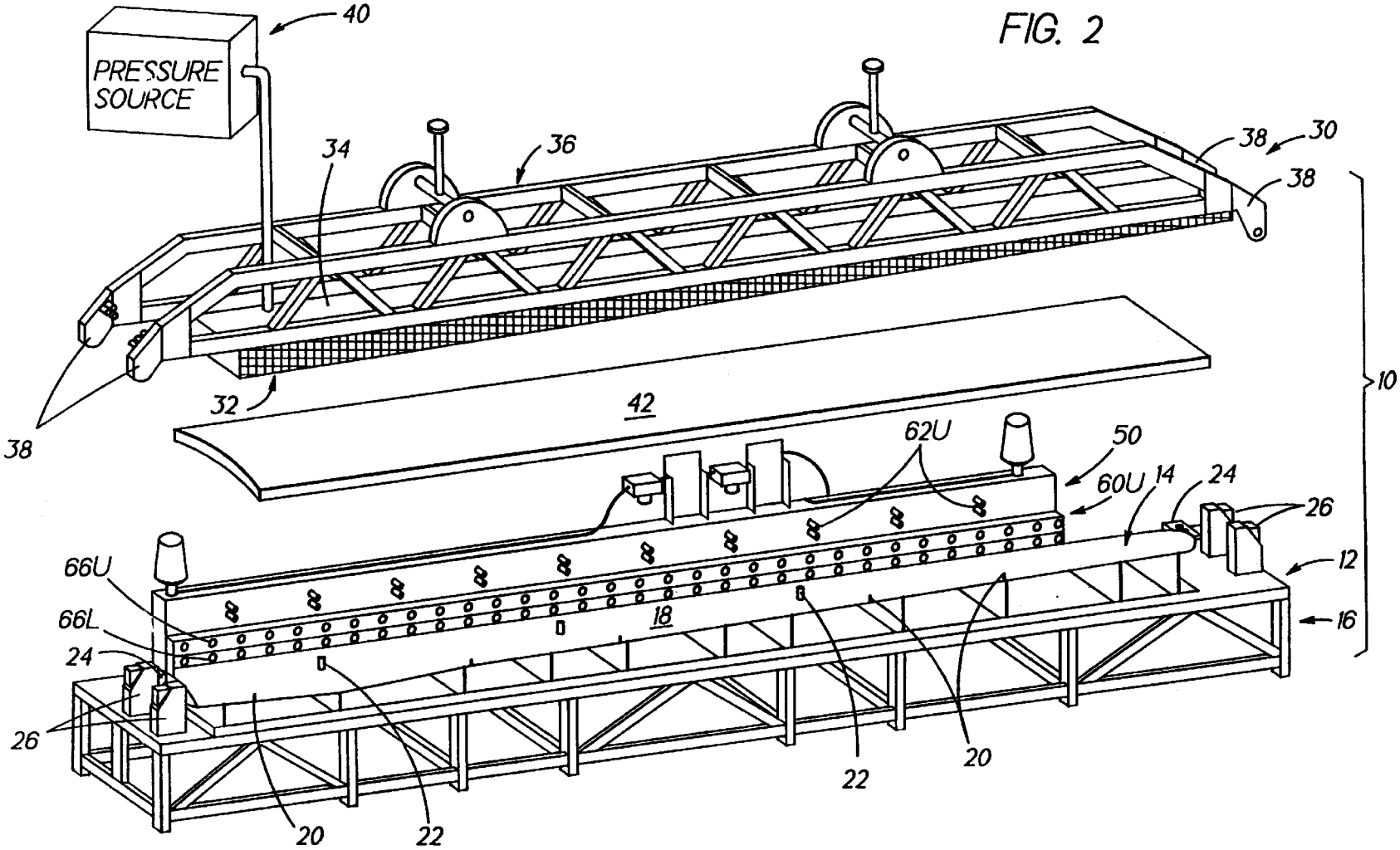
FIG. 2 is a perspective view of a compaction fixture and a sheath spreading/insertion apparatus according to the present invention.

The apparatus and methods described in further detail hereinbelow comprise part of the manufacturing protocol for fabricating main rotor blades for H-60 helicopters manufactured by the Sikorsky Aircraft Division of United Technologies Corporation. In particular, the apparatus and methods described herein have particular utility for fabricating the H-60 growth main rotor blade developed by Sikorsky Aircraft. It will be appreciated, however, that the apparatus and methods described herein have applicability in fabricating main rotor blades in general.

An H-60 growth main rotor blade 100 is exemplarily illustrated in FIGS. 1A–1D, and includes a leading edge 102 and a trailing edge 104, which in combination define the chord of the rotor blade 100, and an inboard end 106 and an outboard (tip) end 108 (an anhedral tip portion of the main rotor blade 100, which is the portion of the blade outboard of the dashed line 109 in FIG. 1A, is separately fabricated as a replaceable component for the main rotor blade 100), which in combination define the span of the rotor blade 100. The main rotor blade 100 comprises upper and lower composite skins 110, 112 that define the upper and lower aerodynamic surfaces of the blade 100, respectively, a honeycomb core 114, a spar 116, one or more counterweights 118, and a leading-edge sheath 120. Adjustable trim tabs 130 (two for the illustrated embodiment) extend rearwardly from the trailing edge 104. The upper and lower composite skins 110, 112, the honeycomb core 114, the spar 116, and the counterweights 118 in combination define a blade subassembly 132.

The composite skins 110, 112 are prefabricated components formed from several plies of prepreg composite material of a type know to those skilled in the art, e.g., for the described embodiment woven fiberglass material embedded in a suitable resin matrix. The upper composite skin 110 has a plurality of locator apertures 134 (see FIG. 1A) formed therethrough to facilitate the location of the spar assembly 116/118 in a compaction fixture as described in further detail hereinbelow. After the main rotor blade 100 has been assembled, the locator apertures 134 are patched with composite material so that the upper composite skin 110 has an aerodynamically smooth surface. The honeycomb core 114 is fabricated of material type typically used in aerospace applications, e.g., for the described embodiment NOMEX® (NOMEX is a registered trademark of E. I. du Pont de Nemours & Co., Wilmington, Del. for aramid fibers or fabrics) and functions as a low weight, structural stiffening member between the upper and lower composite skins 110, 112.

The spar 116 is a prefabricated component and functions as the primary structural member of the main rotor blade 100, reacting the torsional, bending, shear, and centrifugal dynamic loads developed in the rotor blade 100 during operation of the helicopter. The spar 116 of the described embodiment is a composite spar of the type disclosed and claimed in commonly-owned, co-pending U.S. patent application Ser. No. 07/995,219 filed 22 Dec. 1992 entitled FIBER REINFORCED COMPOSITE SPAR FOR A ROTARY WING AIRCRAFT. The composite spar 116 comprises upper and lower side walls corresponding to upper and lower airfoil surfaces, respectively, and forward and aft conic closures corresponding to leading and trailing edges, respectively, of the main rotor blade 100. The upper and lower side walls comprise a plurality of pre-ply layers, each pre-ply layer including unipack plies and cross plies of prepreg composite material, i.e., fibrous material embedded in a resin matrix. The unipack plies, which have longitudinally (axial) orientated fibers, are of equal width and staggered to provide a tapered edge with the upper and lower side walls. The cross plies, which have ±40° orientated fibers, have varying widths that form a staggered butt joint about the periphery of the forward and aft conic closures. While the described embodiment of the main rotor blade 100 incorporates a composite spar 116, one skilled in the art will appreciate that the apparatus and methods of the present invention may also be utilized in manufacturing main rotor blades wherein the spar is fabricated as a metallic structural member, e.g., a titanium spar.

One or more counterweights 118, one of which is illustrated in further detail in FIG. 1D, are utilized to statically and dynamically balance the main rotor blade 100. The counterweights 118 are fabricated from less dense to more dense materials, e.g., foam, tungsten, and lead, respectively, for the described embodiment, in the spanwise direction from the inboard end 106 to the outboard end 108 to provide the necessary weight distribution for statically and dynamically balancing the main rotor blade 100. The counterweights 118 are fabricated to include hardpoints 136 that provide the physical engagement between the counterweights 118 and the inner mold line (IML) surface of the leading edge sheath 120. The counterweights 118 are adhesively bonded to the spar 116 to form a spar assembly 116/118 wherein the bonded counterweights 118 are in an interposed position between the leading edge sheath 120 and the leading edge of the spar 116.

The leading edge sheath 120, which is illustrated in greater detail in FIG. 1C, is a prefabricated hybrid component fabricated from composite materials and abrasion-resistive materials. The sheath 120 has a generally V-shaped configuration that defines the leading edge 102 of the main rotor blade 100. The sheath 120 comprises one or more plies 122 of prepreg composite material, e.g., woven fiberglass material embedded in a suitable resin matrix for the described embodiment, that define the inner mold line (IML) of the leading edge sheath 120, a first abrasion strip 124, and a second abrasion strip 126. For the described embodiment of the leading edge sheath 120, the first abrasion strip 124 is fabricated from titanium and the second abrasion strip 126 is fabricated from nickel. The tip end 108, i.e., outboard end, of the leading edge sheath 120 has the nickel strip 126 bonded to the titanium strip 124 as illustrated in FIG. 1C. The titanium strip 124 with the nickel strip 126 overlay is adhesively bonded to the prepreg composite plies 122 to form the leading edge sheath 120. Exposed segments 128 of the prepreg composite plies 122 facilitate adhesive bonding of the leading edge sheath 120 in combination with the blade subassembly 132. The exposed segments 128 include finished edges 128A (a method and apparatus for defining the finished edges 128A of the leading-edge sheath 120 is described in commonly-owned, co-pending U.S. patent application entitled AN EOP SCRIBE DEVICE (S-4887)) that have been formed to define the proper integration of the leading-edge sheath 120 in combination with blade subassembly 132 The leading edge sheath 120 is removable to facilitate replacement thereof. The leading edge sheath 120, and in particular the titanium strip 124 and the nickel strip 126 overlay, provides abrasion protection for the leading edge 102 of the main rotor blade 100. The leading edge sheath 120 also provides control of airfoil tolerances of the main rotor blade 100.

Figure 3:
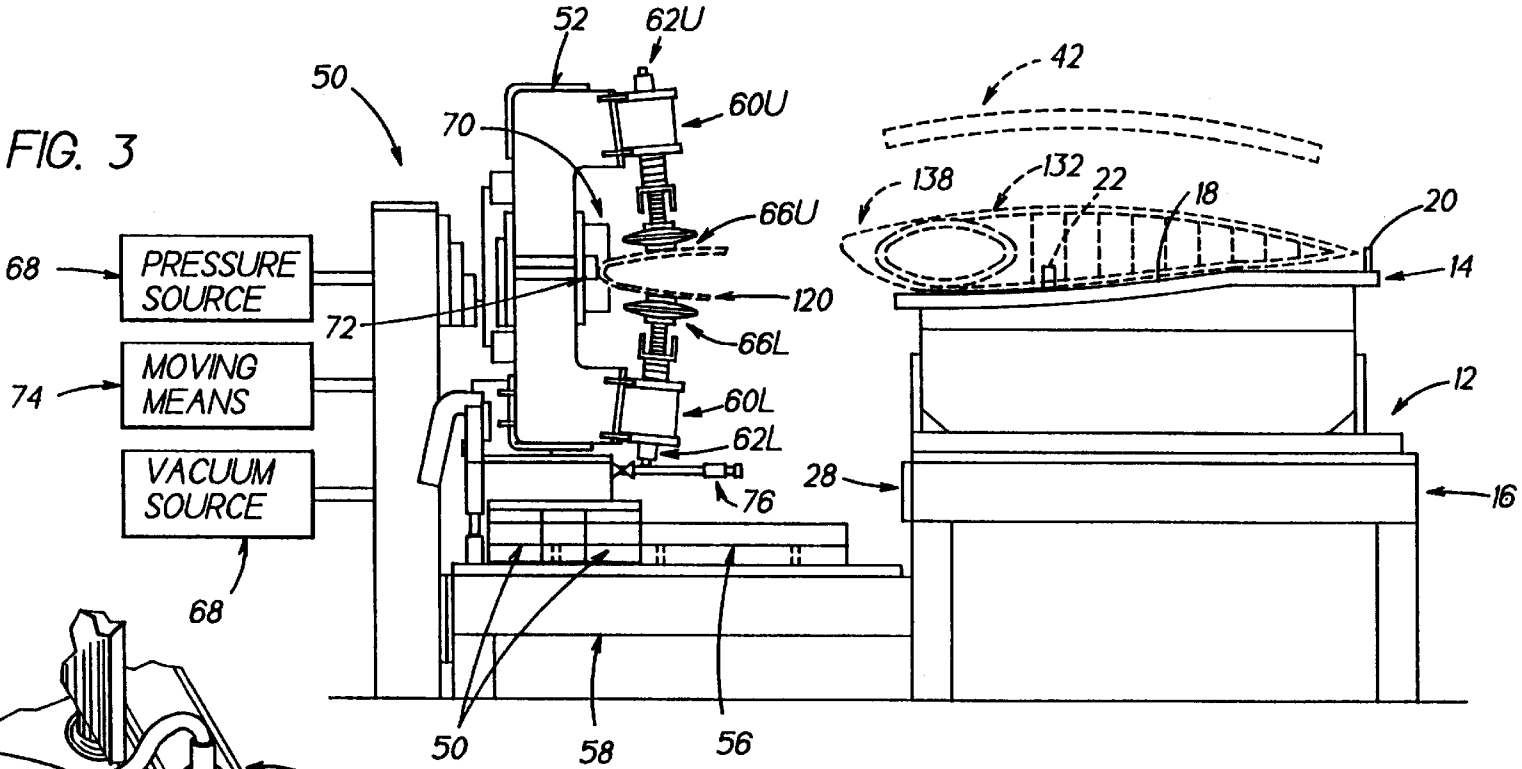
FIG. 3 is a partial [plan] *elevation* view of the apparatus of FIG. 2.
Figure 3A:
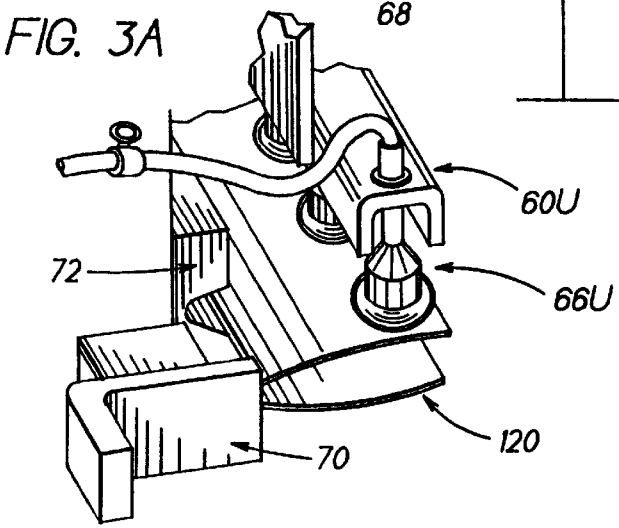
FIG. 3A is a partial perspective view of the sheath spreading/insertion apparatus of FIG. 3.

With reference to FIGS. 2–3, 3A, the apparatus according to the present invention include a compaction fixture 10 and a sheath spreading/insertion apparatus 50. The compaction fixture 10 includes a lower assembly 12 and an upper assembly 30, which, in secured combination, define the compaction fixture 10 which is operative to compact the assembled blade subassembly 132. The lower assembly 12 comprises a contoured upper airfoil nest 14 mounted on a support structure 16. The contoured upper airfoil nest 14 has an outer mold line (OML) surface 18 that defines the OML of the upper airfoil surface of the rotor blade 100, i.e., the upper composite skin 110.

Affixed in combination with the OML surface 18 of the contoured upper airfoil nest 14 are a plurality of tooling pins 20 (five for the described embodiment). The tooling pins 20 function as location markers for locating the upper composite skin 110 in aligned combination on the contoured upper airfoil nest 14. Also affixed in combination with the OML surface 18 of the contoured upper airfoil nest 14 are a plurality of pusher pins 22 (three for the described embodiment). The pusher pins 22 are operative to define the chordwise alignment of the spar assembly 116/118 in combination with the upper composite skin 110, honeycomb core 114 combination as layed-up in the contoured upper airfoil nest 14. The pusher pins 22 are sized to allow insertion of the pins 22 through the locator apertures 134 formed in the upper composite skin 110.

Affixed in combination with the support structure 12 at the inboard and outboard ends of the contoured upper airfoil nest 14 are spar stanchions 24. The spar stanchions 24 in operative combination define the spanwise alignment of the spar assembly 116/118 in combination with the upper composite skin 110, honeycomb core 114 combination as layed-up in the contoured upper airfoil nest 14. Also affixed in combination with the support structure 16 at each end thereof are a pair of locking members 26. One or more hard stops 28 also form part of the support structure 16 (see FIG. 3).

The upper assembly 30 comprises a pressure bladder or bag 32, a contoured backplate 34, and a structural support truss 36. The pressure bag 32 is sized to the spanwise and chordwise dimensions of the blade subassembly 132. For the described embodiment of the growth main rotor blade 100, the pressure bag 32 has dimensions of about 3 feet in the chordwise direction and about 24 feet in the spanwise direction. The pressure bag 32 is sealingly fastened to the contoured backplate 32, and is pressurized during the compaction process to develop the pressure forces required to compact the blade subassembly 132. The contoured backplate 34 defines the OML of the lower airfoil surface, i.e., the lower composite skin 112, and is operative to function as a reaction surface against the back pressures developed in the pressure bag 32 during the compaction process.

Due to the overall size of the pressure bag 32, large pressure forces are developed during pressurization thereof during the compaction process (within the range of about 52,000 pounds to about 103,000 pounds total). The structural support truss 36 is operative to counteract such large pressure forces to prevent damage to the upper assembly 30 during the compaction procedure. Each end of the support truss 36 includes a pair of complementary locking members 38. When the upper assembly 30 is lowered (e.g., by means of a crane) into combination with the lower assembly 12, the complementary locking members 38 interact with the locking members 26 to allow the upper and lower assemblies 30, 12 to be temporarily locked in combination, e.g., by pinned connections, to effectuate the compaction process. A pressure source 40 is pneumatically interconnected with the pressure bag 32 and operative to provide the pressurizing gas to pressurize the pressure bag 32 during the compaction process.

As is evident from an examination of FIGS. 2–3, the sheath spreading/insertion apparatus 50 is precisely co-located adjacent the lower assembly 12 of the compaction fixture 10 inasmuch as the compaction fixture 10 and the sheath spreading/insertion apparatus 50 have an interactive functional relationship during the fabrication protocol of the main rotor blade 100. The sheath spreading/insertion apparatus 50 is operative, during the compaction process effectuated by the compaction fixture 10, to insert the prefabricated leading edge sheath 120 in combination with the blade subassembly 132 layed-up in the compaction fixture 10. *In the described embodiment,* [T]*t*he sheath spreading/insertion apparatus 50 comprises an elongate stanchion 52 having a length corresponding to the span of the leading-edge sheath 120 that is movably supported by rolling members 54. The rolling members 54 interact with rails 56 secured in combination with an elongate support table 58 so that the stanchion 52 is movable with respect to the compaction fixture 10. The support table 58 is precisely positioned with respect to the lower assembly 12 to facilitate insertion of the leading edge sheath 120 in combination with the blade subassembly 132 during the compaction procedure.

The sheath spreading/insertion apparatus 50 further includes [upper] *first* and [lower] *second* elongate carriage members 60U, 60L that are mounted in movable combination with the elongate stanchion 52. A plurality of pneumatic cylinders 62U, 62L operatively interconnect the respective carriage members 60U, 60L to the stanchion 52. A pressure source 64 is pneumatically interconnected to the pneumatic cylinders 62U, 62L and operative to provide pressurized air thereto for synchronized movement of the carriage members 60U, 60L with respect to the stanchion 52 between a disengaged position, an engaged position, and an operating position. While the embodiments of the compaction fixture 10 and the sheath spreading/insertion apparatus 50 described herein utilize separate pressure sources 40, 64, it will be appreciated that a common pressure source may be utilized for the compaction fixture 10 and the sheath spreading/insertion apparatus 50 according to the present invention in lieu of the separate pressure sources 40, 64 described herein.

Pluralities of suction cups 66U, 66L are disposed in aligned combination, i.e., rows, with the respective carriage members 60U, 60L along the spanwise length thereof. For the described embodiment, one hundred and eighty suction cups 66U, 66L are mounted in combination with the respective carriage members 60U, 60L (ninety suction cups per carriage member). Each individual suction cup 66U, 66L has a bellowed configuration (to facilitate engagement of the cups with the contours of the respective OML surfaces of the leading-edge sheath 120), and an outer diameter of about two and one-half inches. Each suction cup 66U, 66L is capable of exerting a suction force of about 100 to about 175 pounds. Suction cups of the type manufactured by PIAB AB, Akersberga, Sweden, may be used in practicing the present invention. The individual suction cups 66U, 66L are fluidically interconnected to a vacuum source 68 which provides suction pressure therefor. The suction cups 66U, 66L are operative to engage and hold the respective OML surfaces of the leading edge sheath 120 with the vacuum source 68 actuated. Subsequent synchronized movement of the respective carriage members 60U, 60L away from one another to the operating position causes spreading of the sheath 120 to facilitate insertion thereof in combination with the blade subassembly 132.

A tip end locator 70 is secured in combination with one end of the elongate stanchion 52 and a plurality of leading edge stops 72 are secured in combination with the stanchion 52 (see particularly FIG. 3A) along the length thereof. The tip end locator 70 is operative to provide spanwise alignment of the leading-edge sheath 120 between the [upper] *first* and [lower] *second* suction cups 66U, 66L to ensure proper insertion thereof in combination with the blade assembly 132. The leading-edge stops 70 are operative to ensure that the leading-edge sheath 120 is properly inserted between the [upper] *first* and [lower] *second* suction cups 66U, 66L so that the suction cups 66U, 66L can engage and hold the OML surfaces of the leading-edge sheath 120.

[A] *In the described embodiment, a* means 74 is provided for moving the elongate stanchion 52 along the rails 56 to [insert] *position* the leading-edge sheath 120 [onto] *in relation to* the blade subassembly 132 and for moving the stanchion 52 away from the compaction fixture 10 once the leading-edge sheath 120 is [inserted onto] *positioned in relation to* the blade subassembly 132. For the described embodiment, the means 74 comprises one or more screw jacks. Mounted on the stanchion 52 are one or more complementary locator rods 76 that interact with the respective hard stops 28 of the support structure 16 during movement of the stanchion 52 towards the compaction fixture 10. For the described embodiment, interaction between the locator rods 76 and the hard stops 28 causes a displacement of the locator rods 76. Continued movement of the stanchion 52 towards the compaction fixture 10 causes a corresponding displacement of the locator rods 76 until a red band thereon becomes visible, indicating to the operator of the sheath spreading/[insertion] *positioning* apparatus 50 that the leading-edge sheath 120 has been properly [inserted onto] *positioned in relation to* the blade subassembly 132. One skilled in the art will appreciate that other means may be utilized to indicate that movement of the stanchion 52 should be terminated inasmuch as the leading-edge sheath 120 has been properly inserted onto the blade subassembly 132. For example, the locator rods 76 and the respective hard stops 28 could be functionally configured and positioned so that contact therebetween automatically terminates the operation of the moving means 74 such that the stanchion 52 ceases moving.

Figure 4A:
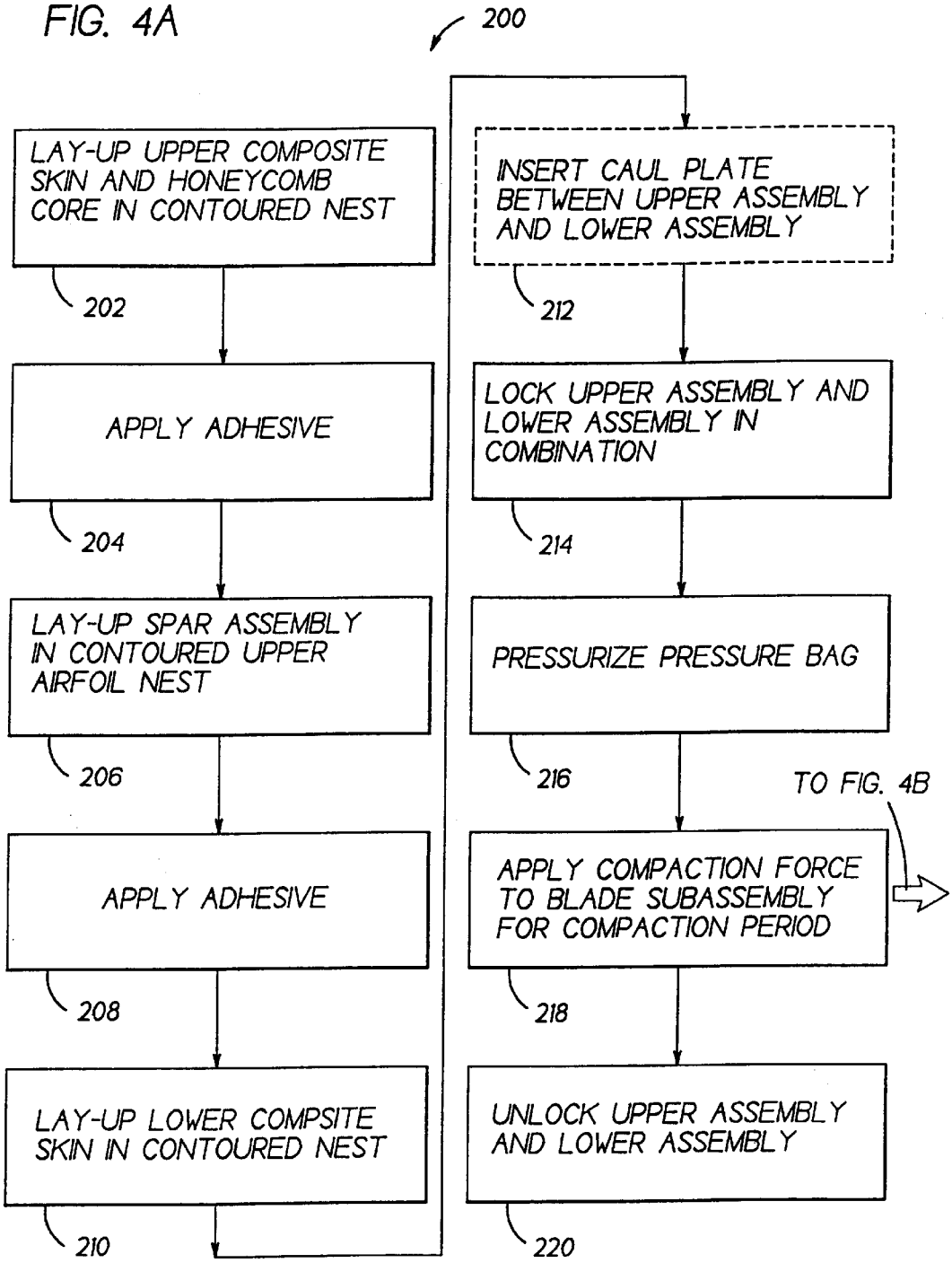
FIG. 4A is a flow chart illustrating the assemblage and compaction process according to the present invention.

The steps of an assemblage and compaction process 200 according to the present invention are schematically illustrated in FIG. 4A. The purpose of the assemblage and compaction process according to the present invention is to assemble the components of the main rotor blade 100 described hereinabove into a cure configuration. The cure configuration of the main rotor blade 100 is inserted into an autoclave (not shown) for final cure to form the finished main rotor blade assembly 100 exemplarily illustrated in FIG. 1A. The upper composite skin 110 and the honeycomb core 114 are provided as a prefabricated combination 110/114 for the initial step 202 of the described embodiment of the assemblage and compaction protocol. This is achieved by applying a suitable film adhesive to the honeycomb core 114 which is then mounted on the upper composite skin 110 and the combination 110/114 is then cured. In step 202, the prefabricated combination 110/114 is layed-up in the contoured upper airfoil nest 14 by aligning the trailing edge 104 of the upper composite skin 110 with the tooling pins 20 and inserting the locator apertures 134 of the upper composite skin 110 onto the pusher pins 22. While providing the upper composite skin 110 and the honeycomb core 114 as a prefabricated combination 110/114 simplifies the assemblage and compaction process according to the present invention, one skilled in the art will appreciate that the upper composite skin 110 and the honeycomb core 114 may alternatively be individually layed-up in combination with the contoured upper airfoil nest 14 in separate sequential steps.

A suitable film adhesive is then applied in step 204 prior to lay-up of the spar assembly 116/118. The film adhesive may be applied directly to the spar assembly 116/118, or alternatively, directly to the layed-up upper composite skin 110. The spar assembly 116/118 is then layed-up in combination with the layed-up upper composite skin, honeycomb core combination 110/114 in step 206. Proper chordwise alignment of the spar assembly 116/118 is achieved by abutting the spar assembly 116/118 against the pusher pins 22 protruding through the upper composite skin 102. Proper spanwise alignment of the spar assembly 116/118 is achieved by ensuring that the ends of the spar assembly 116/118 abut the spar stanchions 24. A suitable adhesive is applied to the exposed surfaces of the honeycomb core 114 and the spar assembly 116/118 in step 208, and then the lower composite skin 112 is layed-up on adhesive-coated honeycomb core 114 and spar assembly 116/118 in step 210. The assembled combination of the upper composite skin 110 and honeycomb core 114 combination, the spar assembly 116/118, and the lower composite skin 112 define the blade subassembly 132 components assembled in the lower assembly 12 of the compaction fixture 10.

Prior to lowering and locking the upper assembly 30 in combination with the lower assembly 12, a caul plate 42 is preferably inserted between the spar subassembly 132 and the upper assembly 30 in step 212. The caul plate 42 is formed from a plurality of composite plies, e.g. for the described embodiment five to nine prepreg fiberglass plies. The caul plate 42 is configured to conform to the lower composite skin 112 of the blade subassembly 132 and is operative to provide an even pressure distribution over the blade subassembly 132 components during compaction thereof. After insertion of the caul plate 42 in optional step 212, the upper assembly 30 is lowered and locked in combination with the lower assembly 12 by means of pinned connections between the respective locking members 26, 38 in step 214. Close-out blocks (not illustrated) preferably have been inserted at the inboard and outboard ends 106, 108 of the blade subassembly 132 prior to locking the upper and lower assemblies 12, 30 in combination. The close-out blocks are operative to prevent blade tip and root end round out during compaction of the blade subassembly 132.

With the upper assembly 30 locked in combination with the lower assembly 12, the leading-edge segment (see reference numeral 138 in FIG. 3) of the assembled blade subassembly 132 protrudes outwardly from the compaction fixture 10, i.e., is not enclosed by the compaction fixture 10. The pressure source 40 is actuated to pressurize the pressure bag 32 in step 216, which exerts pressure forces via the caul plate 42 (or directly if the caul plate 42 is not utilized) to compact the assembled blade subassembly 132. For the described embodiment, the pressure bag 32 is pressurized so that pressure forces within the range of about 5 psi to about 10 psi are exerted against the assembled blade subassembly 132. The assembled blade subassembly 132 is subjected to compaction pressure for a predetermined compaction period in step 218. For the described embodiment of the main rotor blade 100, the described assemblage and compaction process has a compaction period within the range of about ten minutes to about fifteen minutes.

During the compaction period the leading-edge sheath 120 is spread and [inserted onto] *positioned in relation to* the exposed leading-edge segment 138 of the assembled blade subassembly 132 by means of a sheath spreading and [insertion] *positioning* process 300 according to the present invention as illustrated in FIG. 4B. Prior to [insertion] *positioning* of the leading-edge sheath 120, a suitable adhesive is applied to the exposed leading-edge segment 138 in step P1 (alternatively the adhesive may be applied to the IML surfaces of the prepreg composite plies 122 of the leading-edge sheath 120).

With the [upper] *first* and [lower] *second* carriage members 60U, 60L in a disengaged position, the leading-edge sheath 120 is inserted between the [upper] *first* and [lower] *second* suction cups 66U, 66L in step 302. The disengaged position of the carriage members 60U, 60L facilitates such insertion without any physical contact between the leading-edge sheath 120 and the suction cups 66U, 66L. Proper insertion of the leading-edge sheath 120 is ensured by the abutting engagement of the sheath 120 against the tip end locator 70 and the leading edge stops 72. The pressure source 64 is actuated to allow synchronized movement of the carriage members 60U, 60L to an engaged position in step 304 wherein the suction cups 66U, 66L abuttingly engage the leading-edge sheath 120.

The vacuum source 68 is then actuated, causing the suction cups 66U, 66L to exert suction forces against the respective OML surfaces of the leading-edge sheath 120 in step 306. The suction forces exerted by the suction cups 66U, 66L are of sufficient strength that the leading-edge sheath 120 remains in engaged combination, i.e., held, by the suction cups 66U, 66L. The pressure source 64 is actuated to allow synchronized movement of the carriage members 60U, 60L back towards the open position to the operating position. Since the suction cups 66U, 66L are exerting suction forces to hold the leading-edge sheath 120, the synchronized movement of the carriage members 60U, 60L to the operating position causes the exposed segments 128 of the sheath 120 to spread apart. For the described embodiment, the finished edges 128A (see FIG. 1C) of the exposed segments 128 of the sheath 120 are typically spaced apart by about one and one-half inches in the normal spaced-apart state. Due to the action of the sheath spreading/insertion apparatus 50, the finished edges 128A of the exposed segments 128 of the sheath 120 are spread apart to a spread-apart condition defined by a separation distance of about two and one-half to three inches between the opposed segments 128 when the carriage members 60U, 60L are moved to the operating position. The spread-apart configuration of the leading-edge sheath 120 facilitates [insertion] *positioning* thereof [onto] *in relation to* the exposed segment 138 of the blade subassembly 132.

[To] *In the described embodiment, to* insert the spread-apart leading-edge sheath 120, the stanchion moving means 74 is actuated to move the stanchion 52 towards the compaction fixture 10 for [insertion] *positioning* of the spread-apart leading-edge sheath 120 in step 310. Proper [insertion] *positioning* of the leading-edge sheath 120 is indicated by the visibility of the red band of the locator rods 76. With the leading-edge sheath 120 fully [inserted onto] *positioned in relation to* the exposed segment 138 of the blade subassembly 132, the hardpoints 136 of the counterweights 118 abuttingly engage the IML of the leading-edge sheath 120, the exposed segments 128 of the prepreg composite plies 122 underlie the upper and lower composite skins 110, 112, and the edges of the upper and lower composite skins 110, 112 abuttingly engage the respective edges of the titanium strips 124.

Once the leading-edge sheath 120 is fully [inserted onto] *positioned in relation to* the exposed segment 138 of the blade subassembly 132, the pressure source 64 is actuated to cause synchronized movement of the [upper] *first* and [lower] *second* carriage members 60U, 60L to the engaged position in step 312. Such synchronized movement allows the spread-part leading-edge sheath 120 to return to its normal spread-apart state, i.e., for the described embodiment, from a spread-apart condition of about two and one-half to three inches to about one and one-half inches. In the normal spaced-apart state, the leading-edge sheath 120 exerts a compaction force against the blade subassembly 132 to facilitate adhesive bonding of the leading-edge sheath 120 in combination with the blade subassembly 132. The vacuum source 68 is shut down in step 314, which terminates the suction forces exerted by the [upper] *first* and [lower] *second* suction cups 66U, 66L against the leading-edge sheath 120. The pressure source is actuated to cause synchronized movement of the carriage members 60U, 60L back to the disengaged position in step 316. Finally, in step 318 the stanchion 52 is returned to the starting position wherein the spreading and [insertion] *positioning* process may be repeated as required.

Once the compaction period has elapsed, the locking members 26, 38 are unlocked, and a crane is utilized to remove the upper assembly 30 from the lower assembly 12 in step 222. The assembled main rotor blade 100 is then removed from the contoured upper airfoil nest 14. The assembled main rotor blade 100 is subsequently cured in an autoclave to form a finished main rotor blade assembly 100.

A variety of modifications and variations of the above-described apparatus and methods for fabricating a main rotor blade are possible in light of the above teachings. It is therefore to be understood that, within the scope of the appended claims, the present invention may be practiced otherwise than as specifically described hereinabove.

What is claimed is:

1. A method for assembling and compacting a blade subassembly that includes an upper composite skin, a lower composite skin, a honeycomb core, and a spar assembly, comprising the steps of:

providing a composite fixture that includes a lower assembly having a contoured upper airfoil nest mounted on a support structure and an upper assembly having a structural support truss, a contoured backplate affixed to the structural support truss, and a pressure bag fastened in sealed combination with the contoured backplate;

laying up the upper composite skin and the honeycomb core in combination in the contoured upper airfoil nest;

locating the spar assembly in chordwise and spanwise alignment in the contoured upper airfoil nest;

laying up said lower composite skin in combination with the spar assembly and the honeycomb core;

locking the upper assembly and the lower assembly in combination; and pressurizing the pressure bag to compact the blade subassembly.

2. The method of claim 1 further comprising the step of inserting a caul plate between the upper assembly and the lower assembly prior to said locking step.

3. A method for spreading and [inserting] *positioning* a leading-edge sheath [onto] *in relation to* a blade subassembly, comprising the steps of:

mounting the leading-edge sheath between [upper] *first* and [lower] *second* rows of suction cups;

imparting synchronized movement to the [upper] *first* and [lower] *second* rows of suction cups to an engaged position wherein the suction cups are in abutting engagement with respective OML surfaces of the leading edge sheath;

generating suction forces in the [upper] *first* and [lower] *second* rows of suction cups to cause the suction cups to hold the respective OML surfaces of the leading-edge sheath;

imparting synchronized movement to the [upper] *first* and [lower] *second* rows of suction cups to an operating position to cause the leading-edge sheath to be spread apart; and

[inserting] *positioning* the spread-apart leading-edge sheath [onto] *in relation to* the blade subassembly.

* * * * *